Nov. 20, 1951     J. K. CLIFFORD     2,575,908
TIRE INFLATING DEVICE
Filed Nov. 20, 1946
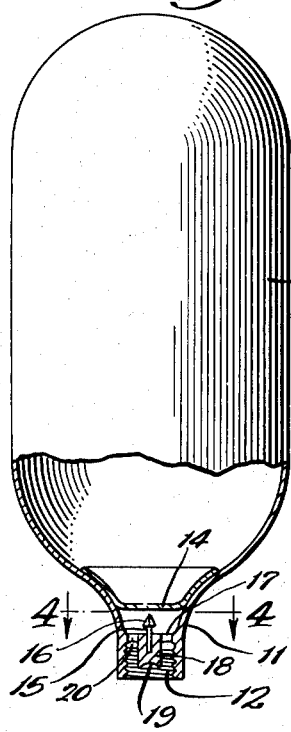
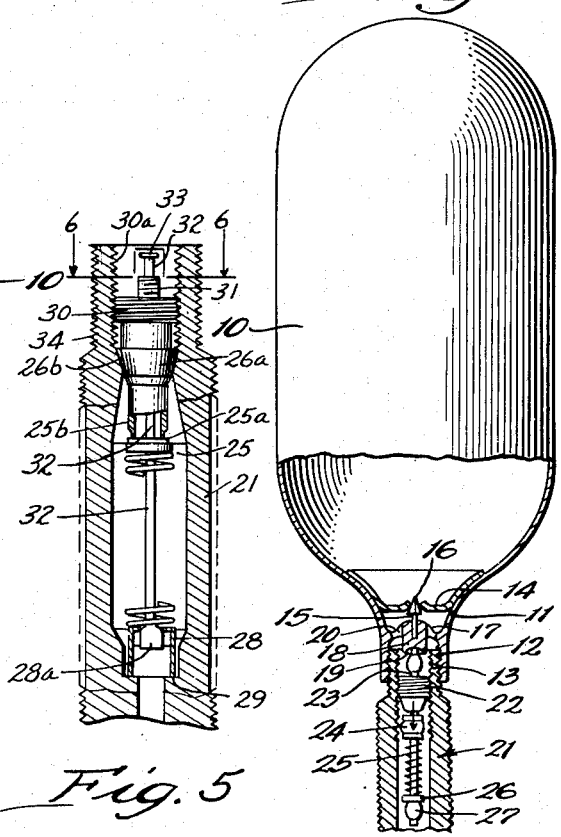
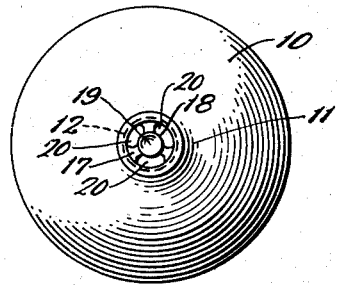
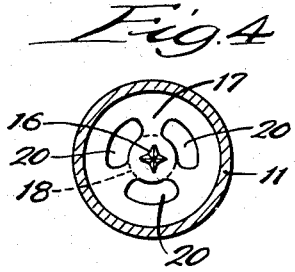
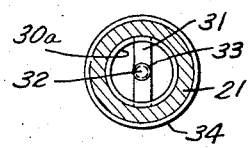
Inventor:
John Kingdon Clifford,
By Dawson, Orth and Spangenberg,
Attorneys Patented Nov. 20, 1951

2,575,908

UNITED STATES PATENT OFFICE 2,575,908

TIRE INFLATING DEVICE

John Kingdon Clifford, Coronado, Calif., assignor of one-half to Walter Clifford Application November 20, 1946, Serial No. 711,149

5 Claims. (Cl. 152—415)

This invention relates to a tire inflating device and is particularly useful for the inflating of automobile, truck, bicycle, and airplane tires, etc.

An object of the invention is to provide simple container means for automatically and quickly inflating tires through the coupling of the container on to the valve tube of a tire inner tube.

Another object is to provide a container structure containing a predetermined amount of compressed gas effective for inflating a selected or known tire tube size whereby an inflation of the tube can be brought about through the coupling of the container on to the valve nipple or tube of the inner tube, such a coupling also serving to form a tight connection between the container and the flow passage leading into the inner tube.

A further object is to provide a container equipped with simple coupling mechanism whereby in the coupling of the container upon the valve nipple, of an inner tube, the container is punctured or opened to permit flow of compressed gas into the inner tube to fill it, the coupling means also maintaining the valve of the tube open to permit the flow of such gas but releasing said valve to close the nipple upon the removal of the container.

Other specific objects and advantages will appear as the specification proceeds.

The invention is illustrated in a single embodiment, by the accompanying drawing, in which—

Fig. 1 is a broken plane view of a container embodying my invention;

Fig. 2 is a view similar to Fig. 1 but showing the container coupled to the nipple of the valve structure of an inner tube;

Fig. 3 is a bottom plan view of the structure shown in Fig. 1;

Fig. 4 is an enlarged sectional view, the section being taken as indicated at line 4 of Fig. 1.

Fig. 5 is an enlarged vertical section of the top part of a valve tube of an inner tube, containing a valve as preferably used in connection with my inflating device; and Fig. 6 is a horizontal section of the upper part of said valve tube and valve itself on the section line 6—6 thereof.

In the illustration given, 10 designates a container which may be of any suitable type, formed of metal or other sturdy material capable of holding the compressed gas required. It will be understood that the container will vary in thickness or strength depending upon the type or size of the tire tube which it is designed to inflate. For example, a relatively light container may be used for the inflating of bicycle tubes, while an extremely sturdy container will be required for the inflating of airplane tubes or certain automobile tubes.

The container 10 is provided with a neck 11 having a threaded interior 12 adapted to receive the externally threaded nipple or valve tube 13 of an inner tire tube.

The container 10 is provided near the neck thereof with a puncturable diaphragm 14. Any suitable metal capable of withstanding the desired pressure but which is puncturable by a pin or other puncture-effecting device may be used. For example, steel, lead, tin, copper, and various metal alloys may be employed depending upon the pressure to be maintained within the cylinder.

In order to effect the puncture, I provide a movably mounted pin 15 adjacent the diaphragm 14. It will be understood that the pin may be carried by any suitable type of movable support. It may be carried simply by a disc slidable in the neck or it may be carried by a diaphragm 17, as illustrated in the drawings. In the illustration given, the pin 15 is mounted within a metal body 18 having a concave seat 19. The body 18 is formed integrally at its top with a thin diaphragm 17 which is yieldable under pressure so as to project the point 16 toward the diaphragm 14.

The diaphragm 17 may be provided with a series of vents or openings 20 through which the compressed gases may pass.

The valve structure 21 of the inner tube may be of any suitable type or construction. Since such structure is well known, a detailed description is believed unnecessary. However, in order to indicate the true nature of my invention if combined with a standard Schrader valve as used on practically all cars, I have shown such a valve in Figs. 5 and 6. In the illustration given, the valve structure 21 comprises a valve tube or nipple 13 externally threaded at its forward end, and also internally threaded to receive the threaded valve member 22 as shown, the valve member 22 defines a seat to receive the valve 24. Slidably mounted in the valve member 22 is a valve stem 23 carrying a valve 24. The valve 24 is mounted upon a spring 25 having its lower end supported upon a seat 26 supported upon the stem by the stem enlargement 27. The upper end of the stem 23 is adapted to engage the concave face 19 of the movable pin support 18. However in the present device I prefer as a valve the type shown in Figs. 5 and 6. As shown in Fig. 5, the spring 25 rests upon a shoulder 29 and this spring pushes the rubber seat 25a against the body 25b of the valve. This body has a rubber seal 26a right above it, which seal is not shown in Fig. 2. This conical seal is pressed against a conical seat 26b in the body of the valve stem 21, by means of the thread 30, which thread continues in part into the portion indicated by 31. This portion is used to tighten the threaded part 30 by means of the cap to close the valve. This latter portion serves a double purpose. It forms in the first place a guide for the stem 32, which has a head 33, somewhat enlarged by preference, which head engages the concave seat 19 of the metal body carrying the pin 15.

In the operation of the device, the container 10 is normally charged with a compressible gas such as, for example, carbon dioxide, and to the required pressure for the selected tire inflating operation. For example, if an automobile tire of the size 6 by 16 is to be used, the selected container for use with such car will have enough gas to give approximately the desired 32 pounds of pressure in this tire or whatever the desired pressure should be. The containers will be of different sizes and thicknesses in order to provide the required amount of gas and at the desired pressure for inflating selected tires.

In order to inflate a tire, it is merely necessary to remove the cap from the ordinary valve tube of an inner tube and to screw the container 10 upon the threaded tube 13. In this operation, the valve 24 is unseated by reason of the engagement of the valve stem 23 with the concave face 19 of the movable member 18 and, at the same time, the diaphragm 17 is pushed forward so that the point 16 punctures the diaphragm 14. The point 16 is preferably of the shape selected or any other shape which will permit the gas to escape readily thereby. Gas from the container passes through the openings 20 of the diaphragm 17 and thence through the unseated valve into the tire tube to inflate it. The container may then be removed and upon its removal, the spring 25 restores the valve 24 to its seat so as to prevent the escape of the gas.

The movement of the member 18 and puncture pin 15 in a forward direction to puncture the diaphragm 14 may be accomplished by the upper edge of the valve nipple or tube 13 itself. In some instances, the pressure exerted by the valve stem 23 may be sufficient. In other cases, the forward movement of these members may be caused by the joint pressure exerted by the valve stem 23 and the threaded nipple 13.

It will be understood that any type of movable body carrying the puncture pin 15 may be employed and any portion of the valve structure 21 may be utilized for providing the necessary pressure to bring about the puncture desired. It will be understood that tremendous wedging force can be exerted by the threaded nipple 13 against such a movable body in cases where the diaphragm is heavy and when such pressures are necessary to bring about its puncture.

If desired, the container neck 11 may be provided with a cap or other suitable protective device, or, if desired, the container may be left uncapped, as illustrated.

It will be understood that the compressed gas, while under pressure in the container 10, may be in a liquid state. Further, the point 16 may be grooved to facilitate the passage of the gas, after the puncture of the diaphragm 14, from the container 10 into the tire to be inflated.

It will be noted that in the operation described, the coupling of the container to the valve tube of the inner tube brings about a sealing between the neck of the container and the valve tube before the diaphragm is punctured so that in the ensuing escape of gas from the container, the flow is directed entirely into the inner tube.

While in the foregoing specification, I have set forth a specific embodiment in considerable detail, it will be understood that such details may be varied widely by those skilled in the art without departing from the spirit of my invention.

I claim:

1. In combination with the valve structure of a tire inner tube wherein a valve is supported in the upper portion of a nipple by a stationary threaded member having a hole therethrough, said valve being provided with a valve stem guided in the hole in said threaded member and normally projecting thereabove but yieldable under pressure to seat on said threaded member, a container holding compressed gas and sealed at one end by a puncturable diaphragm, a puncture pin movably supported in said container adjacent said diaphragm, means for coupling said container to said nipple to seal the connection and to force said puncture pin against said diaphragm, said puncture pin being engaged by said threaded member upon depression of said valve stem to unseat said valve, whereby compressed gas flows through said punctured diaphragm and said valve structure to inflate said tube.

2. In combination with the valve structure of a tire inner tube wherein a valve is supported in the upper portion of an externally and internally threaded nipple by a stationary threaded member having a hole therethrough, said valve being provided with a valve stem guided in the hole in said stationary member and normally projecting thereabove but yieldable under pressure to seat on said stationary member, a container holding compressed gas and sealed at one end by a puncturable diaphragm, a puncture pin movably supported in said container adjacent said diaphragm, threaded means for coupling said container to said nipple to seal the connection and to force said puncture pin against said diaphragm, said puncture pin being engaged by said threaded member upon depression of valve stem to unseat said valve, whereby compressed gas flows through said punctured diaphragm and said valve structure to inflate said tube.

3. In a device for inflating a tire or the like having a nipple containing movable valve elements supported by a stationary threaded member and operable when released to close the nipple and when depressed to open the nipple, the improvement comprising a container holding gas of a predetermined pressure and sealed at one end with a puncturable diaphragm, said container being adapted to fit over said nipple to effect a seal therewith, a puncture-effecting device movably supported in said container adjacent said diaphragm and adapted to bottom against said stationary threaded member to puncture said diaphragm, said device being also adapted to engage and depress said movable valve elements to open the nipple.

4. In combination with the externally and internally threaded valve nipple of an inner tube, a valve means threadedly supported within said nipple by a stationary member having a hole therethrough, said valve means including a stem movably supported in said hole and provided with a head normally held above said stationary member by means of a spring to close said valve, a container equipped with an internally threaded neck, a diaphragm sealing said container adjacent said neck, and movably mounted puncture-effecting means in said container neck adapted to be thrust forwardly to puncture said diaphragm when said threaded neck of the container is screwed upon the threaded nipple of said inner tube, said movably mounted means engaging the stationary member of said valve after depressing said stem to open the valve and thereby admitting compressed gas to said inner tube upon puncturing said diaphragm.

5. In combination with the valve structure of a tire inner tube wherein a valve is supported in the upper portion of a nipple by a stationary threaded member having a hole therethrough, said stationary member having a conical rubber seal engaging a conical seat in the upper portion of said nipple, said valve being provided with a valve stem guided in the hole in said threaded member and normally projecting thereabove but yieldable under pressure to seat on said threaded member, a container holding compressed gas and sealed at one end by a puncturable diaphragm, a puncture pin movably supported in said container adjacent said diaphragm, means for coupling said container to said nipple to seal the connection and to force said puncture pin against said diaphragm, said puncture pin being engaged by said threaded member upon depression of said valve stem to unseat said valve, and to puncture said diaphragm, whereby said threaded member actuates said puncture pin without damaging said conical seal.

JOHN KINGDON CLIFFORD.

REFERENCES CITED

The following references are of record in the file of this patent:

UNITED STATES PATENTS

| Number | Name | Date |
| --- | --- | --- |
| 1,022,301 | Campbell | Apr. 2, 1912 |
| 1,253,856 | Marquette | Jan. 15, 1918 |
| 1,766,182 | Markus | June 24, 1930 |
| 2,068,266 | Engel | Jan. 19, 1937 |
| 2,249,608 | Greene | July 15, 1941 |
| 2,330,774 | Alexander | Sept. 28, 1943 |
| 2,336,708 | Ward | Dec. 14, 1943 |
| 2,450,461 | Wallach | Oct. 5, 1948 |
| 2,513,817 | Pennington | July 4, 1950 |

FOREIGN PATENTS

| Number | Country | Date |
| --- | --- | --- |
| 112,209 | Germany | Aug. 29, 1900 |
| 276,209 | Italy | July 15, 1930 |